July 21, 1964 W. J. BRYANT 3,141,210
COVER HOLDDOWN DEVICE
Filed May 9, 1962 3 Sheets-Sheet 1
FIG. 1.     FIG. 2.     FIG. 3.
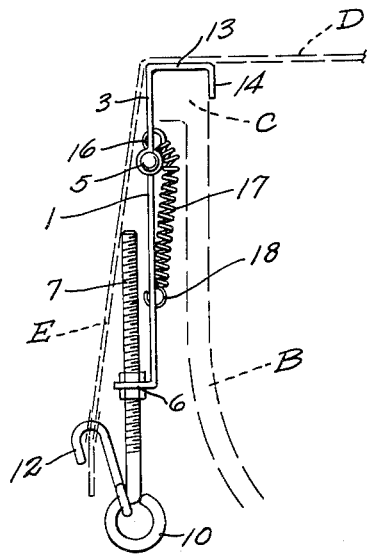
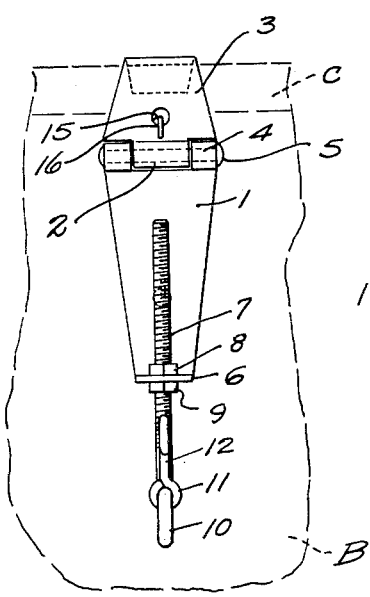
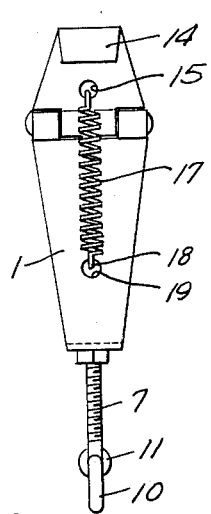
FIG. 4.
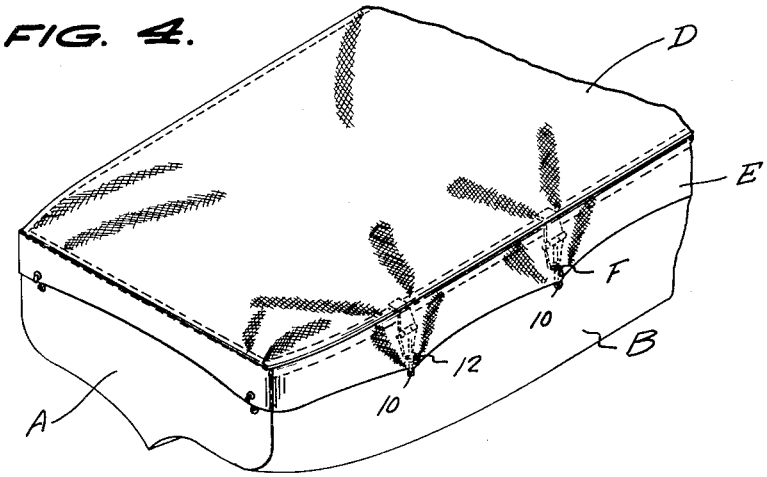
INVENTOR.
WILLIAM J. BRYANT,
BY *Linton + Linton*
ATTORNEYS.

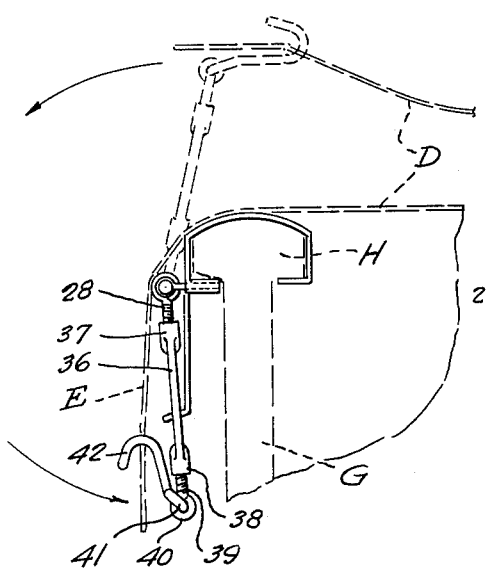
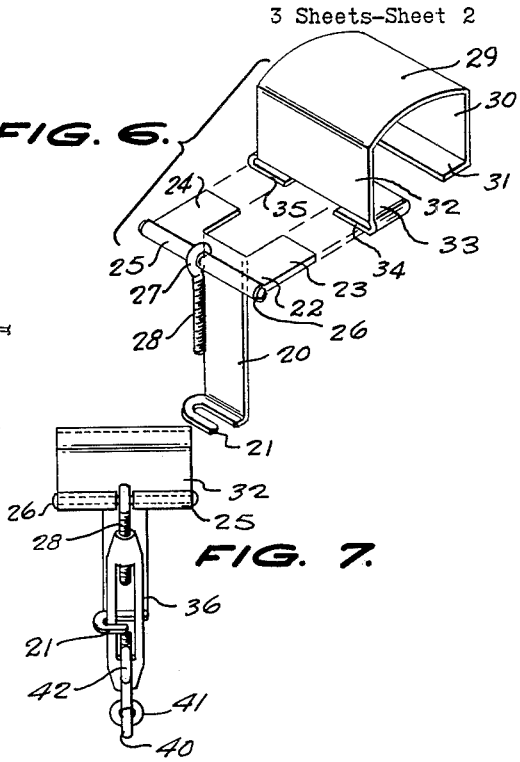
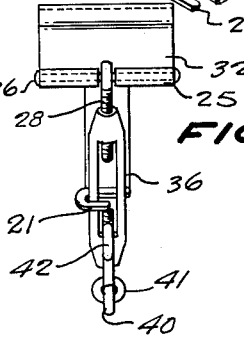
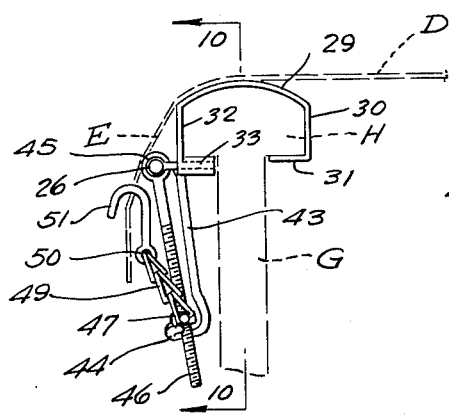
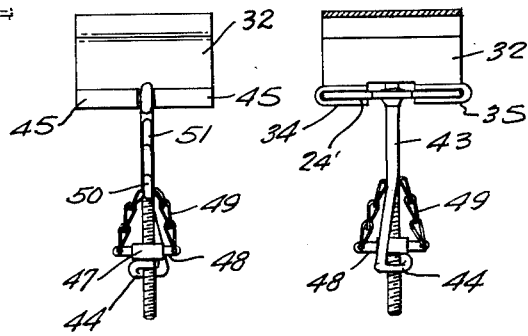

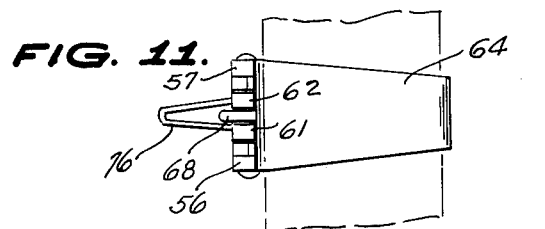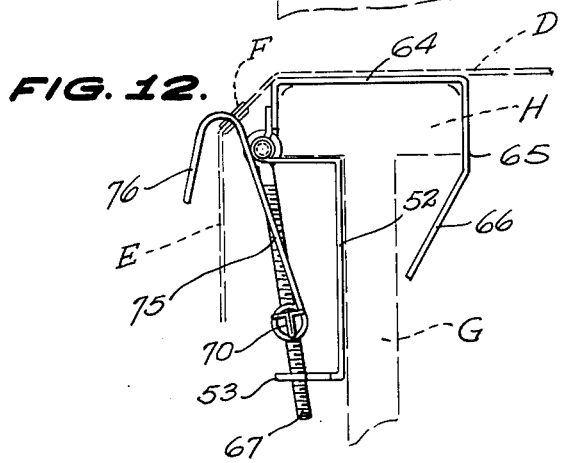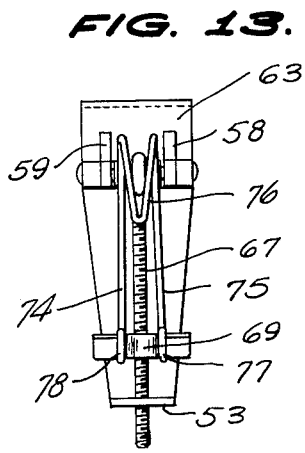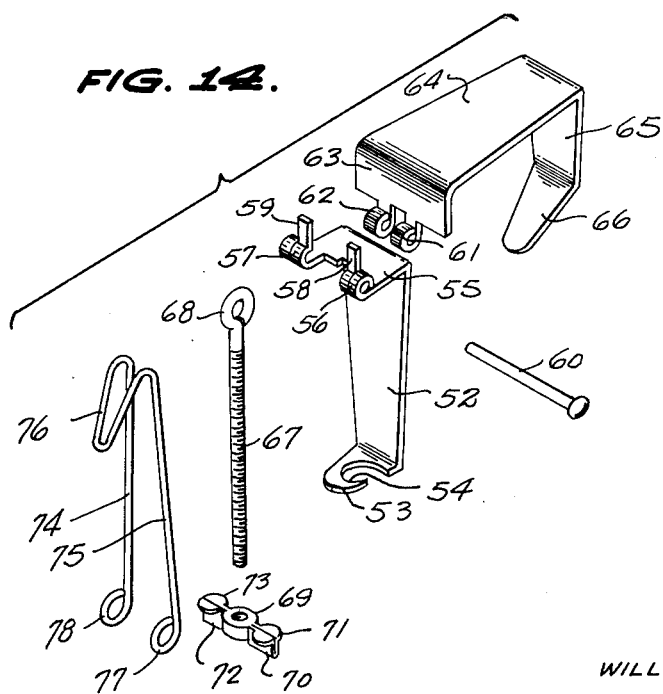

United States Patent Office 3,141,210
Patented July 21, 1964

3,141,210
COVER HOLDDOWN DEVICE
William J. Bryant, 2 Ravine Ave., Glenwood Heights, Wheeling, W. Va.
Filed May 9, 1962, Ser. No. 193,464
11 Claims. (Cl. 24—73)

The present invention is concerned with devices for holding down covers extending across objects and particularly open top objects such as boats, trailers, vats, open truck bodies and the like.

The principal object of the present invention is to provide a device which together with a plurality of similar devices can be mounted upon the top edge of an object, such as the gunwale of an open top boat, for example, and operated to draw and hold a cover for the object taut.

A further and important object of the invention is to provide an economically produceable device for holding down covers on objects and which device is quick acting for both drawing down the cover or releasing the same and yet will retain the cover against removal even when subjected to strong pulls on the cover such as strong winds, can be adjusted for use with various size and shaped covers and objects to be covered and can be mounted on or removed from the object quickly and without requiring special tools.

Further objects of the invention will be in part obvious and in part pointed out in the following detailed description of the accompanying drawings in which;

FIGURE 1 is a side elevation of a device according to the present invention as mounted upon a boat, partially shown in cross-section in dotted lines, with a cover drawn taut thereon.

FIGURE 2 is a front elevation of the device mounted on a boat, a side of which is partially shown.

FIGURE 3 is a rear elevation of the device.

FIGURE 4 is a perspective view of the rear portion of a boat with a cover retained thereon by a plurality of the present devices.

FIGURE 5 is a side elevation of a modified form of the device with a boat and cover shown partially in cross-section in dotted lines in both the cover applying position and drawn position.

FIGURE 6 is a perspective exploded view of portions of the modified device.

FIGURE 7 is a front elevation of the modified device.

FIGURE 8 is a side elevation of a third form of the device as mounted on a boat with cover shown in cross-section in dotted lines.

FIGURE 9 is a front elevation of the third form of the device.

FIGURE 10 is a rear elevation of said third form.

FIGURE 11 is a top view of a fourth form of the present device as mounted on a boat gunwale, partially shown in dotted lines.

FIGURE 12 is a side elevation of said fourth form as mounted on a boat, partially shown in cross-section in dotted lines with a portion of a cover.

FIGURE 13 is a front elevation of said fourth form.

And FIGURE 14 is an exploded perspective view of said fourth form prior to assembly.

Referring now more particularly to the accompanying drawings, wherein like and corresponding parts are designated by similar reference characters, there is shown by way of example only, parts of an open boat such as canoes, runabouts or the like upon which the present devices are to be used, but it is to be appreciated that the devices can be used on other objects and as further examples thereof, reference is made to open top trailers, truck bodies and the like.

Referring now to FIGURES 1 to 4 the stern A of an open top boat B is shown having a gunwale C which extends outwardly of the side of the boat. A cover D has marginal portions E through which a series of eyelets F have been assembled around said cover. A series of the present devices are positioned along said gunwales for engaging said eyelets and holding said cover taut across the boat top.

The holddown device of FIGURES 1–4 includes a leaf 1 having a knuckle 2, a second leaf 3 having a pair of knuckles 4 with knuckle 2 positioned therebetween and a pintle 5 extending through said knuckles pivotally connecting said leaves.

Leaf 1 has a bottom lateral projection 6 with an opening (not shown) through which extends a threaded rod 7 with nut 8 on said rod above said projection and nut 9 below said projection for adjusting the position of said rod relative to said projection. Said rod has an eye 10 upon which is slideably mounted eye 11 of a hook 12.

Leaf 3 has a lateral portion 13 of a width corresponding to gunwale C and a bent end 14. Said leaf 3 further has an opening 15 through which extends end 16 of a coil spring 17 whose other end 18 extends through an opening 19 in leaf 1 tending to hold said leaves in line as shown.

In the use of the holddown device projection 13 is placed on the top of gunwale C with end 14 on one side and leaf 3 on the other. Leaf 1 is pivoted upwardly and hook 12 engaged with an eyelet F of cover D. Then leaf 1 is pivoted downwardly pulling said cover taut with the aid of spring 17. A plurality of these devices are spaced around the gunwale C each for engaging one eyelet F to hold cover D across said boat.

The holddown device of FIGURES 5–7 is for use where gunwales H extend laterally of both sides of a boat or body G and includes a leaf 20 having a hook 21 at one end and a plate 22 normal thereto at the other end with projections 23 and 24. Also leaf 20 has a pair of knuckles 25 at said other end with pintle 26 extending therethrough and through eye 27 of an eye bolt 28.

A curved resilient plate 29 of a width corresponding to gunwale H has a side wall 30 of a depth corresponding to said gunwale and a bent end portion 31 for fitting under said gunwale. Said plate also has a side wall 32 corresponding to the depth of said gunwale which has a bent end portion 33 for fitting under the opposite side of said gunwale. End portion 33 further has reverse portions 34 and 35 extending thereunder parallel to but spaced from said end portion 33 sufficiently for slideably receiving projections 23 and 24 of leaf 20.

A turnbuckle 36 has end 37 in threaded engagement with eye bolt 28 and its opposite end 38 in threaded engagement with an eye bolt 39 whose eye 40 has eye 41 of hook 42 slideably encircling the same.

In the use of the holddown device of FIGURES 5–7, plate 29 is mounted on gunwale H by flexing walls 30 and 32 outwardly and then releasing the same to assume the normal tunnel appearance thereof. When it is desired to fasten down a cover D projections 23 and 24 are inserted between end portion 33 and reverse portions 34 and 35 respectively. Turnbuckle 36 is then pivoted upwardly to the position indicated in dotted lines in FIGURE 5 and hook 42 inserted through an eyelet F. Turnbuckle 36 is then pivoted downwardly pulling cover D therewith and then inserted in hook 21 retaining the cover.

The holddown device of FIGURES 8–10, uses plate 29 of the previous form as well as plate 22 with projections 23 and 24. However, in lieu of leaf 20, a rod 43 is connected and extends normal to plate 22 and has a bent end portion forming hook 44. Plate 22 has knuckles 45 with a pintle 26 extending therethrough and through the eye of an eyebolt 46.

A nut 47 is in threaded engagement with eye bolt 46 and has pins 48 extending laterally thereof. The opposite ends of a chain 49 are connected to said projections while eye 50 of hook 51 encircles said chain.

Here again eye bolt 46 is pivoted upwardly in use to permit hook 51 to engage an eyelet F and then is pivoted downwardly pulling cover D therewith and the eyebolt inserted in hook 44 for being retained thereby.

The fourth modification of the holddown device shown in FIGURES 11–14, inclusive, is also for use with gunwales H and includes a leaf 52 having a lateral end 53 recessed at 54 providing a hook and a lateral opposite end 55 having knuckles 56 and 57 and fingers 58 and 59 extending parallel to leaf 52.

A pintle 60 extends through knuckles 56 and 57 and also through knuckles 61 and 62 positioned between knuckles 56 and 57 and extending from side wall 63 of leaf 64. Said leaf 64 has a second side wall 65 parallel to wall 63 but spaced apart the distance of the top of gunwale H while end wall 63 extends the depth of said gunwale. End wall 65 has an inwardly bent resilient end portion 66.

Eye 68 of eye bolt 67 is positioned between knuckles 61 and 62 and has pintle 60 also extending therethrough.

A wing nut 69 is in threaded engagement with eye bolt 67 and has wings 70 and 72 with annular flanges 71 and 73 respectively provided on top of said wings and spaced from the annular center of the nut.

A wire V-shaped hook having legs 74 and 75 has bent end portion 76 and eyes 77 and 78. Eye 77 encircles and is rotatable about wing 70 between flange 71 and the center of the wing nut while eye 78 encircles and is rotatable about wing 72 between flange 73 and the wing nut center. V-shaped hook 74–78 is thus pivotally connected to wing nut 69.

The holddown device of FIGURES 11–14 is mounted upon gunwale H or a similarly shaped object by flexing end portion 66 outwardly and inserting the gunwale between leaf 64 and side walls 63 and 65. Releasing end portion 66 allows the same to return to its normal position and beneath the gunwale. Fingers 58 and 59 abutting side wall 63 cause end 55 of leaf 52 to extend beneath the opposite side of said gunwale with leaf 52 abutting the side of the boat G.

Pivoting eye bolt 67 upwardly allows hook 76 to engage a cover eyelet F and pulling eyebolt 67 downwardly draws the cover D tight as shown in FIGURE 12. Then eyebolt 67 can be inserted in recess 54 retaining the cover taut.

Nuts 8 and 9, turnbuckle 36, nut 47 and wing nut 69 can be rotated to adjust the position of their respective hooks 12, 42, 51 and 76 to determine the desired tightness of cover D when connected thereto and to adjust for various sized and shaped covers.

The present holddown devices are capable of considerable modification and such changes thereto as come within the scope of the appended claims are deemed to be a part of the invention.

I claim:

1. A cover holddown device mountable upon an open top object comprising a member mountable upon an open top object over an edge defining one side of said open top, a second member pivotally connected to said first member and positioned relative thereto for being suspended from said first member when mounted on said object, means adjustably carried by said second member for being moved to and retained at various positions along the length of said second member, and a hook for engaging the cover being pivotally connected to said adjustable means and extending lengthwise of said second member.

2. A cover holddown device mountable upon an open top object comprising a member mountable upon an open top object along an edge defining one side of said open top, a second member connected to said first member and positioned relative thereto for being suspended from said first member when mounted on said object edge, a rod pivotally connected to said second member for pivoting to and from the same and a hook pivotally connected to said rod and means tending to retain said rod alongside said second member.

3. A cover holddown device mountable upon an open top object comprising a member mountable upon and encircling an edge defining the open top of the object, a second member detachably connected to said first member and extending therefrom, an elongated member pivotally connected to said first member for pivoting to and from said second member, a hook pivotally carried by said elongated member and said second member having a hook for receiving said elongated member and detachably retaining the same alongside said second member.

4. A cover holddown device as claimed in claim 3 wherein said first member includes a top, a pair of side walls extending from said top and inturned ends each extending laterally of one of said walls whereby said first member can encircle a T-shaped edge of the object.

5. A cover holddown device as claimed in claim 3 wherein said elongated member is adjustable lengthwise thereof.

6. A cover holddown device as claimed in claim 3 wherein means adjustable lengthwise of said elongated member connects said first mentioned hook to said elongated member.

7. A cover holddown device as claimed in claim 3 wherein said first member has at least one slot and said second member has at least one projection insertable in said slot for detachably connecting said members.

8. A cover holddown device mountable upon an open top object comprising a member mountable upon an edge defining the open top of the object, a second member pivotally connected to said first member and positioned relative thereto for being suspended from said first member when mounted on said object, a hook carried by said second member, a threaded member pivotally connected to said second member, a second threaded member, a turnbuckle right and left screw link in threaded engagement with said threaded members and insertable in said hook and a second hook connected to said second threaded member whereby said second hook can engage a cover for drawing the same taut.

9. A cover holddown device mountable upon an open top object comprising a member mountable upon an edge defining the open top of the object, a second member pivotally connected to said first member and positioned relative thereto for being suspended from said first member when mounted on said object, a hook carried by said second member, a threaded elongated member pivotally connected to said second member for pivoting to and from said second member, a threaded member in threaded engagement with said elongated member, a chain connected to said threaded member and a hook for engaging said cover, connected to said chain.

10. A cover holddown device mountable upon a T-shaped edge of an open top object comprising an inverted U-shaped member mountable upon the T-shaped edge, a second U-shaped member having an end connected to said first member for being suspended therefrom and extending beneath said T-shaped edge, a hook carried by the other end of said second member, an eyebolt pivotally connected to said second member for pivoting to and from the same and engaging said hook for being retained thereby, a nut in threaded engagement with said eyebolt and a second hook connected to said nut for engaging the cover and drawing the same taut.

11. A cover holddown device mountable upon a T-shaped edge of an open top object comprising a member having a top the width of the T-shaped edge, a pair of side walls normal to said top, an inwardly extending resilient finger extending from one of said walls, and knuckles extending from the other of said side walls, a second member having a straight medial portion, a pair of lateral ends, knuckles carried by one of said ends pivotally connected to the knuckles of said first member, fingers extending from said one of said ends for engaging one of said side walls limiting the pivoting of said members, and a hook carried by the other of said ends and an eyebolt pivotally connected to said one of said ends for pivoting to and from said second member and capable of being inserted in said hook for being retained thereby, a wing nut in threaded engagement with said eyebolt and a hook for engaging said cover pivotally connected to said wing nut.

References Cited in the file of this patent

UNITED STATES PATENTS

| | | |
|---|---|---|
| 31,963 | Farrar | Apr. 9, 1861 |
| 672,881 | Allen | Apr. 30, 1901 |
| 775,399 | Halladay | Nov. 22, 1904 |
| 1,191,762 | Conant | July 18, 1916 |
| 1,639,870 | Valsvig | Aug. 23, 1927 |
| 1,678,544 | Whitaker | July 24, 1928 |
| 1,692,712 | Tannebaum | Nov. 20, 1928 |
| 2,204,824 | Rock | June 18, 1940 |
| 2,448,716 | Hurd | Sept. 7, 1948 |
| 2,596,860 | McCrory et al. | May 13, 1952 |
| 2,825,522 | Bolmes | Mar. 4, 1958 |
| 2,961,725 | McGee | Nov. 29, 1960 |
| 3,003,740 | Balko | Oct. 10, 1961 |